UNITED STATES PATENT OFFICE.

JAMES MINER BAILEY, OF BUENOS AIRES, ARGENTINA.

INTERNAL-COMBUSTION ENGINE.

1,110,861.

Specification of Letters Patent. Patented Sept. 15, 1914.

Application filed July 10, 1912. Serial No. 703,571.

*To all whom it may concern:*

Be it known that I, JAMES M. BAILEY, a citizen of the United States, and a resident of Buenos Aires, Argentina, South America, have invented new and useful Improvements in Internal-Combustion Engines, of which the following is a full, clear, and exact description.

The object of the invention is to provide certain new and useful improvements in internal combustion engines, whereby the piston, the cylinder and the parts in the crank case can be readily oiled without danger of the lubricant passing into the combustion chamber and being burned therein. For the purpose mentioned use is made of a water-jacketed cylinder head providing a combustion chamber in the said cylinder and spaced from the inner surface thereof to form with the cylinder an annular space and a piston reciprocating in the said cylinder and having a tubular extension passing into the said annular space.

A practical embodiment of the invention is represented in the accompanying drawings forming a part of this specification, in which similar characters of reference indicate corresponding parts in both views.

Figure 1:
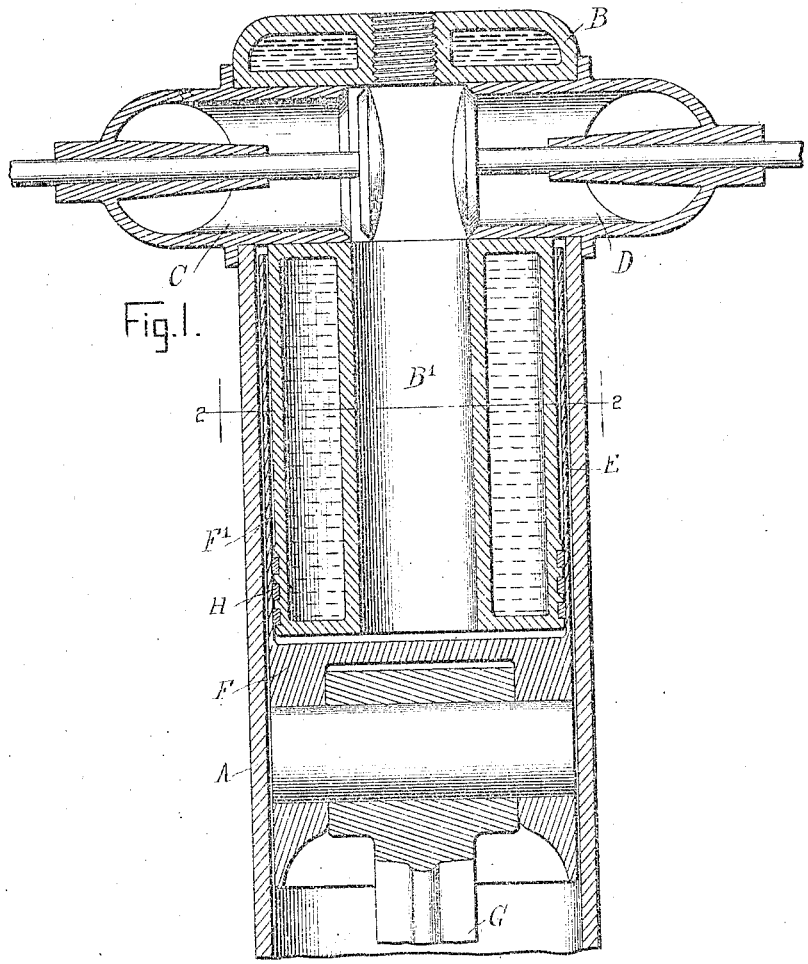
Figure 2:
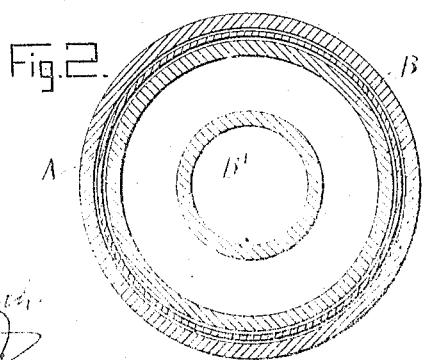

Figure 1 is a sectional side elevation of the improvement; and Fig. 2 is a sectional plan view of the same on the line 2—2 of Fig. 1.

As shown in Fig. 1, the cylinder A of the internal combustion engine is provided with a cylinder head B having the usual valve-controlled inlets and outlets C and D for the entrance of the combustible mixture into the cylinder and the exhaust of the burned gases from the cylinder. The cylinder head B is provided with a water-jacketed combustion chamber B' of cylindrical form and extending into the upper end of the cylinder A and spaced from the inner surface of the cylinder wall to form with the latter an annular space E. In the cylinder A below the combustion chamber B' reciprocates the piston F connected by a pitman G with the crank arm on the main shaft of the engine, and the piston F is provided at its upper end with a tubular extension F' extending into the annular space E. The water-jacketed combustion chamber B' is provided exteriorly and near the lower end thereof with packing rings H engaging the inner surface of the tubular extension F' so as to form a tight joint between the combustion chamber B' and the cylinder A. The tubular extension F' exceeds in length the stroke of the piston F so that when the latter is in lowermost position the upper end of the tubular extension F' is still in engagement with the packing rings H, and when the piston F is in its uppermost position, as shown in Fig. 1, then the top of the tubular extension F' is within a short distance of the top of the cylinder A, and the parts in the crank casing can be properly oiled without danger of any oil working into the combustion chamber B', and consequently the latter is kept free from the deleterious influence of the lubricant. It is well known that lubricant burning in the combustion chamber cakes therein and hence is liable to clog the working parts. It will further be noticed that by the arrangement described the cylinder A does not require a water jacket as the products of combustion do not come directly in contact with it, and the cylinder as well as the piston can be made comparatively light as the piston does not require packing rings.

Having thus described my invention, I claim as new and desire to secure by Letters Patent:

1. An internal combustion engine provided with a cylinder, a cylinder head provided with a cylindrical combustion chamber open at both ends and extending into the said cylinder, the combustion chamber having an integral water jacket surrounding the same and extending from the top to the bottom of the combustion chamber, the said water jacket being spaced from the cylinder wall to form an annular space between the said water jacket of the combustion chamber and the cylinder, and a piston mounted to reciprocate in the said cylinder below the said water jacket and the combustion chamber, and having a tubular extension passing into the said annular space.

2. An internal combustion engine provided with a cylinder, a cylinder head provided with a combustion chamber of cylindrical form open at both ends and extending into the said cylinder, the combustion chamber having a water jacket surrounding the same throughout its length, and spaced from the cylinder wall to form an annular space between the water jacket of the combustion chamber and the cylinder, a piston mounted to reciprocate in the said cylinder below the water jacket and the combustion chamber and having a tubular extension passing into the said annular space, and packing rings held exteriorly on the said water jacket of the combustion chamber near the lower end thereof and in engagement with the inner face of the said tubular piston extension.

3. An internal combustion engine provided with a cylinder, a cylinder head held on the outer end of the cylinder and provided with a combustion chamber open at both ends, and a water jacket surrounding the combustion chamber, the water jacketed combustion chamber extending into the upper end of the cylinder and spaced from the inner surface thereof to provide an annular space between the water jacket of the combustion chamber and the cylinder, packing rings held exteriorly on the water jacket of the combustion chamber near the inner end thereof, and a piston mounted to reciprocate in the said cylinder below the water jacketed combustion chamber and having a tubular extension of a length exceeding the stroke of the piston, the said tubular piston extension extending into the said annular space and engaging the packing rings, the said cylinder head having a valve controlled inlet and a valve controlled outlet extending horizontally above the water jacketed combustion chamber and opening into said head above the open top of the combustion chamber at opposite sides thereof.

4. In an internal combustion engine, a cylinder, a cylinder head provided with a depending cylindrical combustion chamber open at both ends and extending into the upper end of the cylinder, a cylindrical water jacket surrounding the combustion chamber and spaced from the inner surface of the cylinder wall to form with the latter an annular space, a piston mounted to reciprocate in the said cylinder below the water jacket and the combustion chamber and having a tubular extension passing into the said annular space, the said cylinder head having a valve controlled inlet and a valve controlled outlet opening into the cylinder head at opposite sides of the combustion chamber above the open top thereof.

5. An internal combustion engine provided with a cylinder, a cylinder head provided with a water jacketed combustion chamber extending into the cylinder and spaced from the inner surface thereof, the combustion chamber being open at both ends, a piston mounted to reciprocate in the said cylinder below the water jacketed combustion chamber and having a tubular extension passing into the said space, the cylinder head having a valve controlled inlet and a valve controlled outlet opening into the head above the open top of the combustion chamber.

In testimony whereof I have signed my name to this specification in the presence of two subscribing witnesses.

JAMES MINER BAILEY.

Witnesses:
RITARO KAKUDA,
G. H. HUBART.